United States Patent
Snider et al.

(10) Patent No.: US 9,475,370 B2
(45) Date of Patent: Oct. 25, 2016

(54) SUNROOF WINDOW ASSEMBLY FOR VEHICLE

(71) Applicant: MAGNA MIRRORS OF AMERICA, INC., Holland, MI (US)

(72) Inventors: Darin J. Snider, Holland, MI (US); Linh Pham, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/843,233

(22) Filed: Sep. 2, 2015

(65) Prior Publication Data

US 2016/0059680 A1   Mar. 3, 2016

Related U.S. Application Data

(60) Provisional application No. 62/146,658, filed on Apr. 13, 2015, provisional application No. 62/045,190, filed on Sep. 3, 2014.

(51) Int. Cl.
  *B60J 7/053* (2006.01)
  *B60J 7/057* (2006.01)

(52) U.S. Cl.
  CPC ...................... *B60J 7/053* (2013.01)

(58) Field of Classification Search
  CPC ........................................................ B60J 7/053
  USPC ............................................. 296/216.01–224
  See application file for complete search history.

(56) References Cited

U.S. PATENT DOCUMENTS

| | | | |
|---|---|---|---|
| 4,081,926 A | 4/1978 | Jardin | |
| 4,298,226 A * | 11/1981 | Mizuma | B60J 7/022 296/216.04 |
| 4,874,202 A | 10/1989 | Ochiai et al. | |
| 4,920,698 A | 5/1990 | Friese et al. | |
| 4,934,098 A * | 6/1990 | Prouteau | B60J 7/053 296/213 |
| 4,995,195 A | 2/1991 | Olberding | |
| 5,146,712 A | 9/1992 | Hlavaty | |
| 5,531,046 A | 7/1996 | Kollar et al. | |
| 5,551,197 A | 9/1996 | Repp et al. | |
| 5,572,376 A | 11/1996 | Pace | |

(Continued)

FOREIGN PATENT DOCUMENTS

| | | |
|---|---|---|
| DE | 202012012291 | 8/2003 |
| EP | 2479366 | 7/2012 |

(Continued)

OTHER PUBLICATIONS

Hollandia TVS 900 Series Power Inbuilt Sunroof.

*Primary Examiner* — Dennis H Pedder

(74) *Attorney, Agent, or Firm* — Gardner, Linn, Burkhart & Flory, LLP

(57) ABSTRACT

A sunroof assembly for a vehicle includes first and second side rails adhesively attached at an in-cabin surface of a vehicle glass roof, which has an aperture formed therethrough and between the side rails. A movable glass sunroof panel is movable along the side rails between a closed position and an opened position. When the movable panel is in its closed position, the movable panel is disposed at the aperture and has its upper surface generally co-planar with the upper surface of the vehicle glass roof. When the movable panel is moved from its closed position towards its opened position, the movable panel moves downward and rearward along the side rails and along and below a portion of the vehicle glass roof.

13 Claims, 15 Drawing Sheets

(56) References Cited

U.S. PATENT DOCUMENTS

| | | |
|---|---|---|
| 5,853,895 A | 12/1998 | Lewno |
| 5,996,284 A | 12/1999 | Freimark et al. |
| 6,119,401 A | 9/2000 | Lin et al. |
| 6,669,278 B2 | 12/2003 | Patelczyk et al. |
| 6,729,674 B2 | 5/2004 | Davis et al. |
| 6,955,009 B2 | 10/2005 | Rasmussen |
| 7,003,916 B2 | 2/2006 | Nestell et al. |
| 7,073,293 B2 | 7/2006 | Galer |
| 7,255,451 B2 | 8/2007 | McCabe et al. |
| 7,332,225 B2 | 2/2008 | Lewno |
| 7,464,501 B2 | 12/2008 | Arimoto et al. |
| 7,838,115 B2 | 11/2010 | Lewno |
| 8,322,073 B2 | 12/2012 | Lewno |
| 8,402,695 B2 | 3/2013 | Smith et al. |
| 8,485,595 B2 | 7/2013 | Maltaverne et al. |
| 8,678,487 B2 * | 3/2014 | Billy .......................... 296/213 |
| 8,915,541 B2 | 12/2014 | Kanai |
| 2003/0213179 A1 | 11/2003 | Galer |
| 2004/0020131 A1 | 2/2004 | Galer et al. |
| 2006/0082192 A1 | 4/2006 | Dubay et al. |
| 2006/0107600 A1 | 5/2006 | Nestell |
| 2008/0106124 A1 | 5/2008 | Snider |
| 2008/0127563 A1 | 6/2008 | Tooker |
| 2008/0155902 A1 | 7/2008 | Kaiser |
| 2011/0056140 A1 | 3/2011 | Lewno |
| 2011/0120020 A1 | 5/2011 | Fourel et al. |
| 2013/0038093 A1 | 2/2013 | Snider et al. |
| 2013/0174488 A1 | 7/2013 | Snider et al. |
| 2013/0255156 A1 | 10/2013 | Snider |
| 2014/0047772 A1 | 2/2014 | Hulst |
| 2014/0097636 A1 | 4/2014 | Snider et al. |
| 2014/0159434 A1 | 6/2014 | Desbois |
| 2015/0224856 A1 | 8/2015 | Snider et al. |

FOREIGN PATENT DOCUMENTS

| | | |
|---|---|---|
| FR | 2983129 | 5/2013 |
| FR | 2985224 | 7/2013 |
| WO | WO2008055476 | 5/2008 |

* cited by examiner

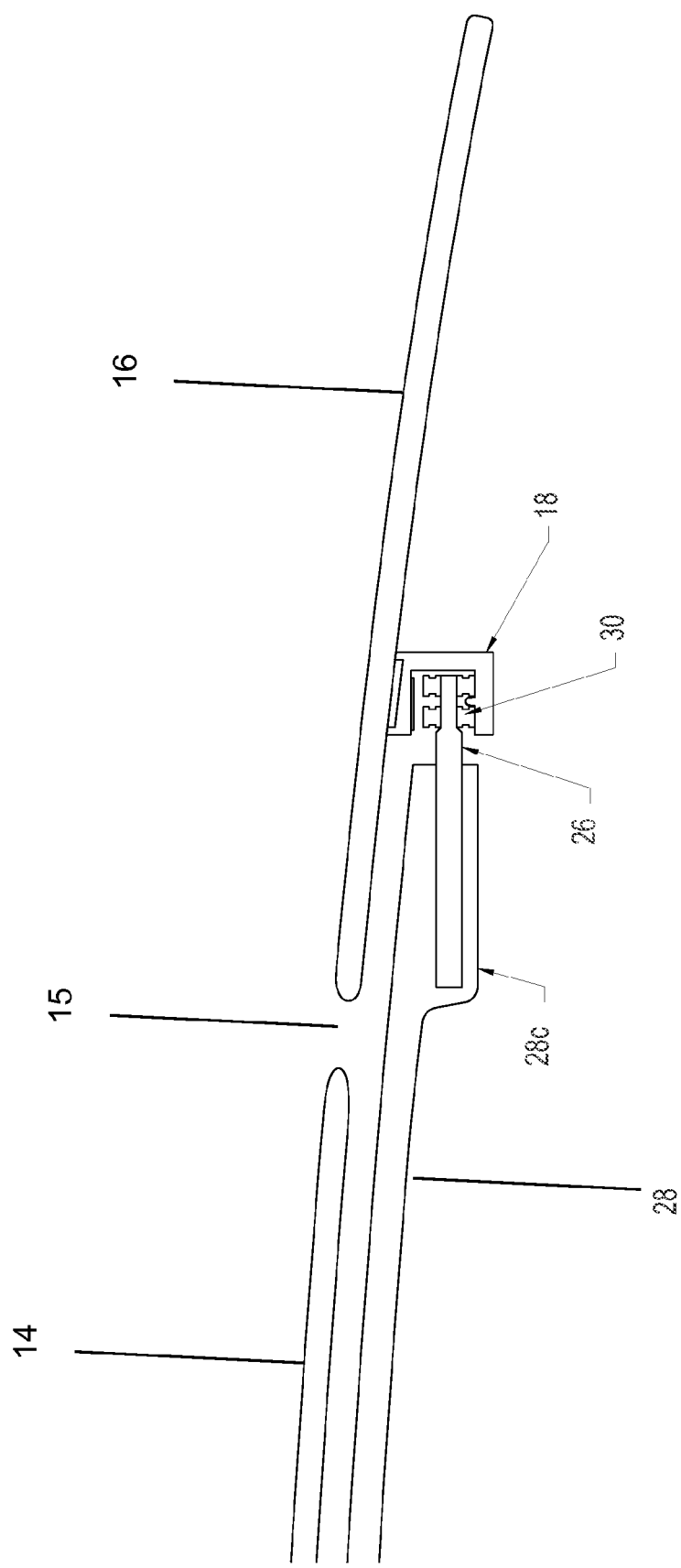

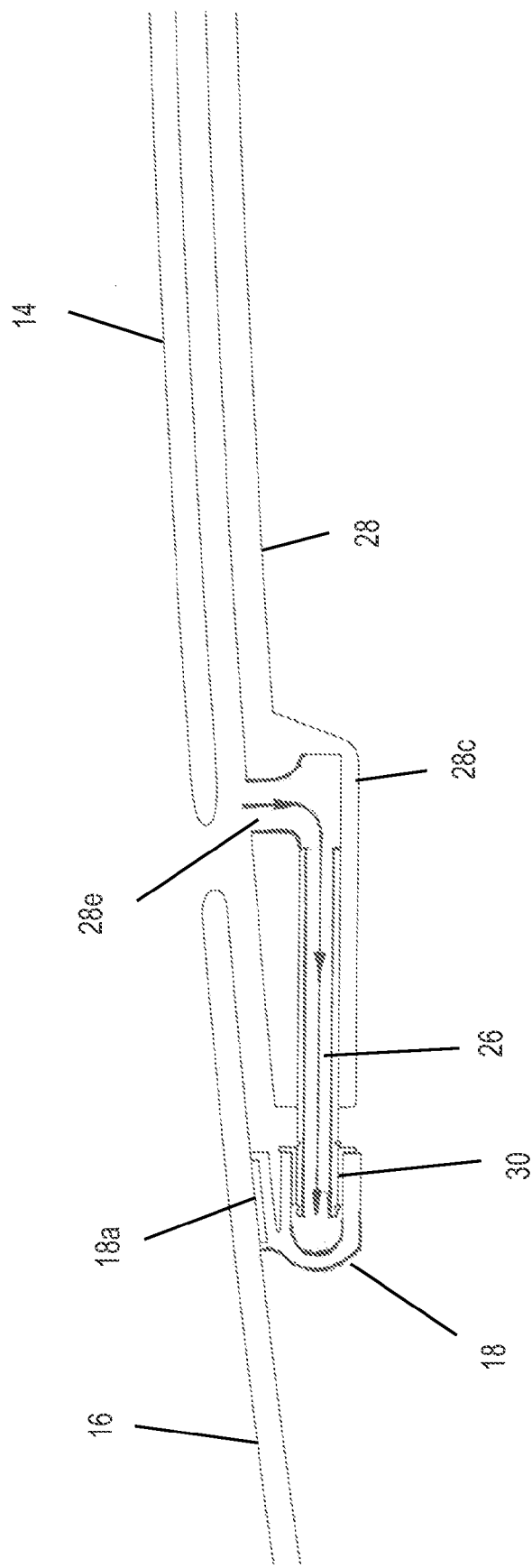

SUNROOF WINDOW ASSEMBLY FOR VEHICLE

CROSS REFERENCE TO RELATED APPLICATIONS

The present application is related to U.S. provisional applications, Ser. No. 62/146,658, filed Apr. 13, 2015, and Ser. No. 62/045,190, filed Sep. 3, 2014, which are hereby incorporated herein by reference in their entireties.

FIELD OF THE INVENTION

The present invention relates to movable or openable/closable sunroof window assemblies for vehicles.

BACKGROUND OF THE INVENTION

It is known to provide an openable/closable sunroof window assembly for an opening in a roof of a vehicle, and such window assemblies may include a movable or slidable window panel is supported by rails and may be moved along the rails to open and close the window. The rails are part of the window assembly and are attached at the sheet metal roof or the like at the roof of the vehicle.

SUMMARY OF THE INVENTION

The present invention provides a sunroof window assembly for a glass roof of a vehicle that has channels or frame portions along which a carrier or guide portion of a movable glass sunroof panel moves as the movable glass sunroof panel is moved between its opened and closed positions. When in its closed position, the outer surface of the movable glass sunroof panel is generally flush or co-planar with the outer surface of the vehicle glass roof.

When the movable panel is opened, the panel is lowered down below the plane of the glass roof and moved along the channels or rails to its opened position, where the movable panel is at least partially disposed below a portion of the glass roof. The channels or rails may be attached at the in-cabin surface of the glass roof, and may be attached at darkened areas of the roof, where a light absorbing or dark coating (such as a ceramic frit layer or the like) is established, such that the rails are not readily viewable from outside the vehicle.

These and other objects, advantages, purposes and features of the present invention will become apparent upon review of the following specification in conjunction with the drawings.

BRIEF DESCRIPTION OF THE DRAWINGS

FIG. 5A is a sectional view of the sunroof window assembly taken along the line A-A in FIG. 5;

FIG. 12 is a sectional view of the front roller of the sunroof window assembly of FIG. 11, showing a water drain/channel for draining water in accordance with the present invention.

DESCRIPTION OF THE PREFERRED EMBODIMENTS

Figure 1:
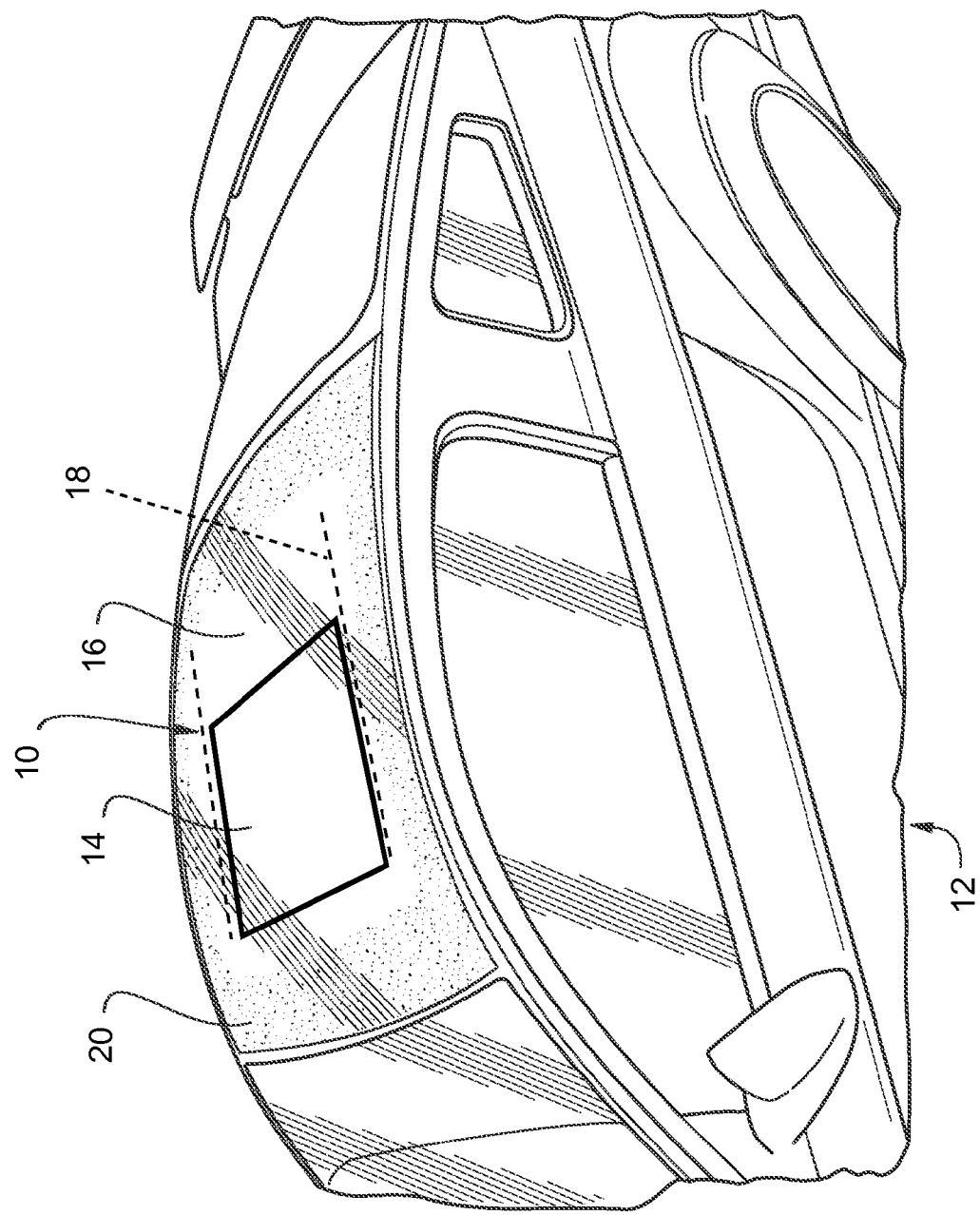
FIG. 1 is a rear perspective view of a vehicle having a sunroof window assembly in accordance with the present invention.

Referring now to the drawings and the illustrative embodiments depicted therein, a sunroof window assembly 10 of a vehicle 12 (FIG. 1) includes a movable glass window panel 14 that is movable relative to the fixed roof or glass panel 16 of the vehicle 12 between an opened position (where the movable panel 14 is moved at least partially away from an aperture 15 formed or established through said fixed glass roof panel 16) and a closed position (where the movable panel is moved to be generally within the aperture 15 with its outer surface generally flush with the outer surface of the fixed glass panel 16). The movable window panel is movable along a pair of side channels or rails 18 relative to the fixed roof. The channel portions or rails 18 are disposed at and along the in-cabin or lower or inner surface of the fixed glass roof to facilitate sliding of movable panel 14 horizontally across the roof between its opened and closed positions.

Optionally, the fixed roof may comprise a transparent glass roof and the movable panel may comprise a transparent glass panel. Optionally, a ceramic frit layer or darkened layer or light absorbing layer 20 or the like is disposed at the fixed window at locations where the channel portions or rails 18 are attached at and at the movable panel where guide portions of the movable panel are attached, so that the channels and guides are not viewable from exterior of the vehicle by a person viewing the glass roof of the vehicle from above the roof. The glass roof may utilize aspects of the glass roof described in U.S. Publication No. 2008-0106124, which is hereby incorporated herein by reference in its entirety.

The sunroof window assembly channels and guides and the like may utilize aspects of rear slider window assemblies, such as those described in U.S. Pat. No. 8,402,695 and/or U.S. Publication No. 2013-0174488, which are hereby incorporated herein by reference in their entireties.

Optionally, the sunroof window assembly or assemblies of the present invention may utilize aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and/or 5,853,895, and/or U.S. Publication Nos. 2014-0047772; 2013-0255156; 2013-0174488; 2011-0056140; 2008-0127563; 2006-0107600; 2004-0020131 and/or 2003-0213179, which are hereby incorporated herein by reference in their entireties. Optionally, the fixed roof or fixed panel and movable window panel may include one or more electrically conductive elements, such as heater grids or the like, which may be powered utilizing aspects of the window assemblies described in U.S. Pat. No. 8,402,695 and/or U.S. Publication No. 2013-0174488, which are hereby incorporated herein by reference in their entireties. The roof and movable panel may comprise any suitable material, such as transparent glass or polycarbonate or the like.

The channels or rails may include generally linear channel portions and curved portions that curve upwardly towards the roof at or near an aperture formed through the roof. The movable panel has guide elements or pins or guides that move along the channels and, as the movable panel is moved towards the aperture and towards its closed position, the guide elements or pins move upward along the curved portions of the channels to move the movable panel upward into the aperture in the roof, whereby the movable panel is received in the aperture and has its outer surface generally flush with the outer surface of the roof. The movable panel may include a perimeter carrier portion or frame portion that includes the guide elements and that extends radially outward from the movable glass panel portion and that seals against the in-cabin surface of the roof when the movable panel is in its closed position.

Figure 4:
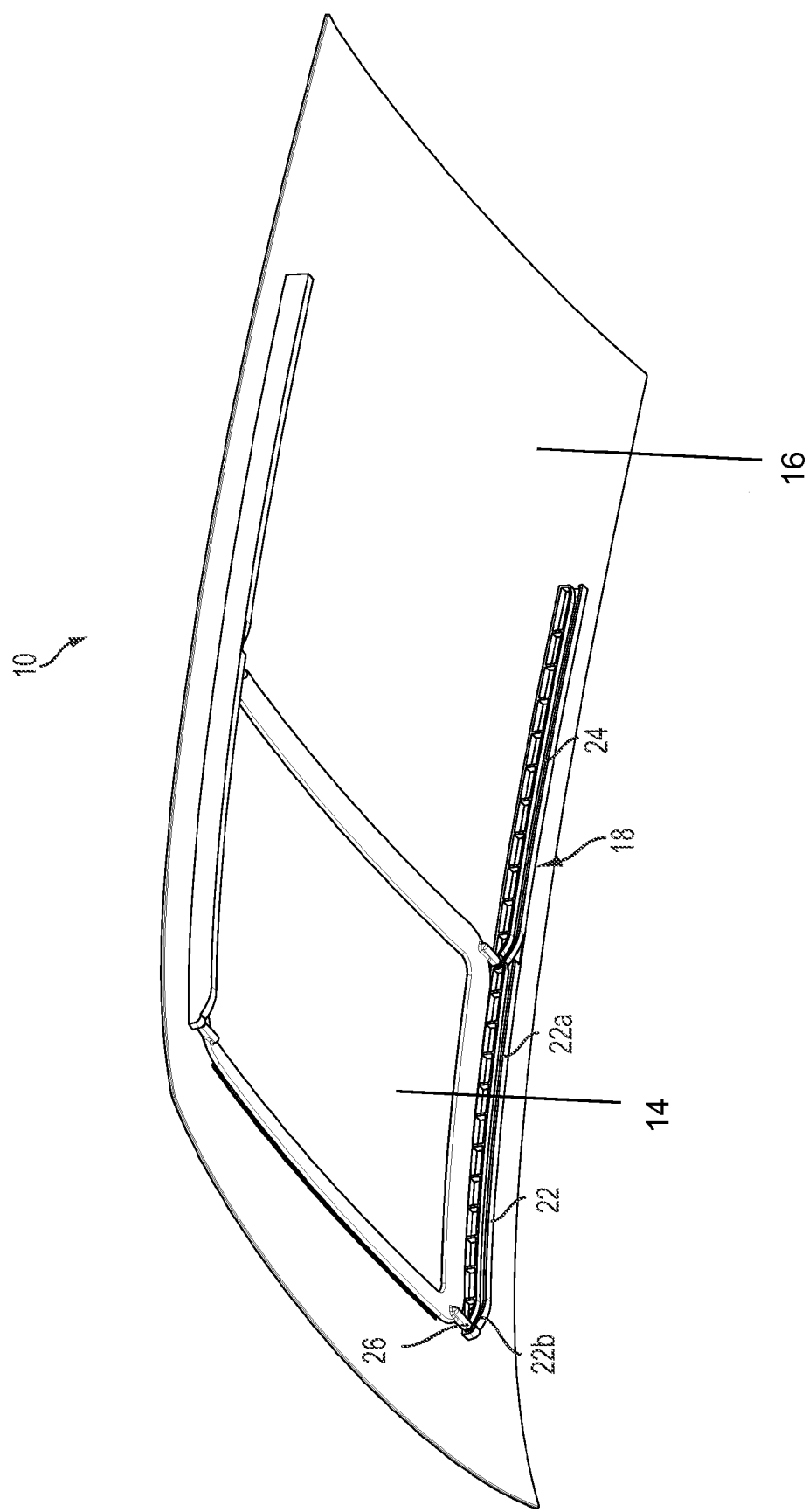
FIG. 4 is a lower perspective view of the sunroof window assembly of FIG. 3.
Figure 5:
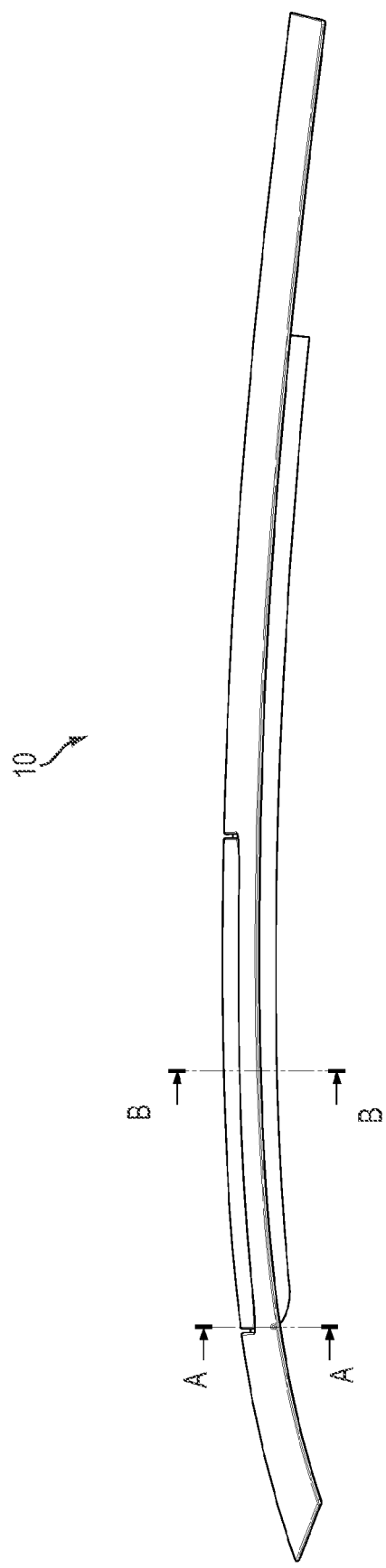
FIG. 5 is a side elevation of the sunroof window assembly of FIG. 3.

As best shown in FIGS. 4 and 5A, a pair of channel followers or guide pins 26 may be disposed at the leading and trailing end regions of the frame portion or frame portions 28 of the movable panel (such as a leading frame portion at the leading end region of the window panel and a trailing frame portion at the trailing end region of the window panel or such as a peripheral frame that circumscribes the movable window panel), and may be biased outwardly away from the frame portion via respective biasing elements or springs. The channel followers and pins guide the movable window panel along the channels or rails, such as via bushings or bearings or rollers 30 at the ends of the pins 26 that roll along the channels or rail guides 22, 24. The pin springs (if applicable) may be inserted into the pins and the channel followers, which are then inserted into mating holes on the frame portion. The springs at all four corners of the frame portion function to "float" the movable window panel between the rails, thus centering the movable window or module and reducing chucking movement when operating or opening/closing the movable panel. In the illustrated embodiment, the pins 26 are fixed relative to the frame 28 and move along the channels 22, 24 of the rails 18 to linearly move the movable panel 14 along the fixed window panel 16.

Figure 2:
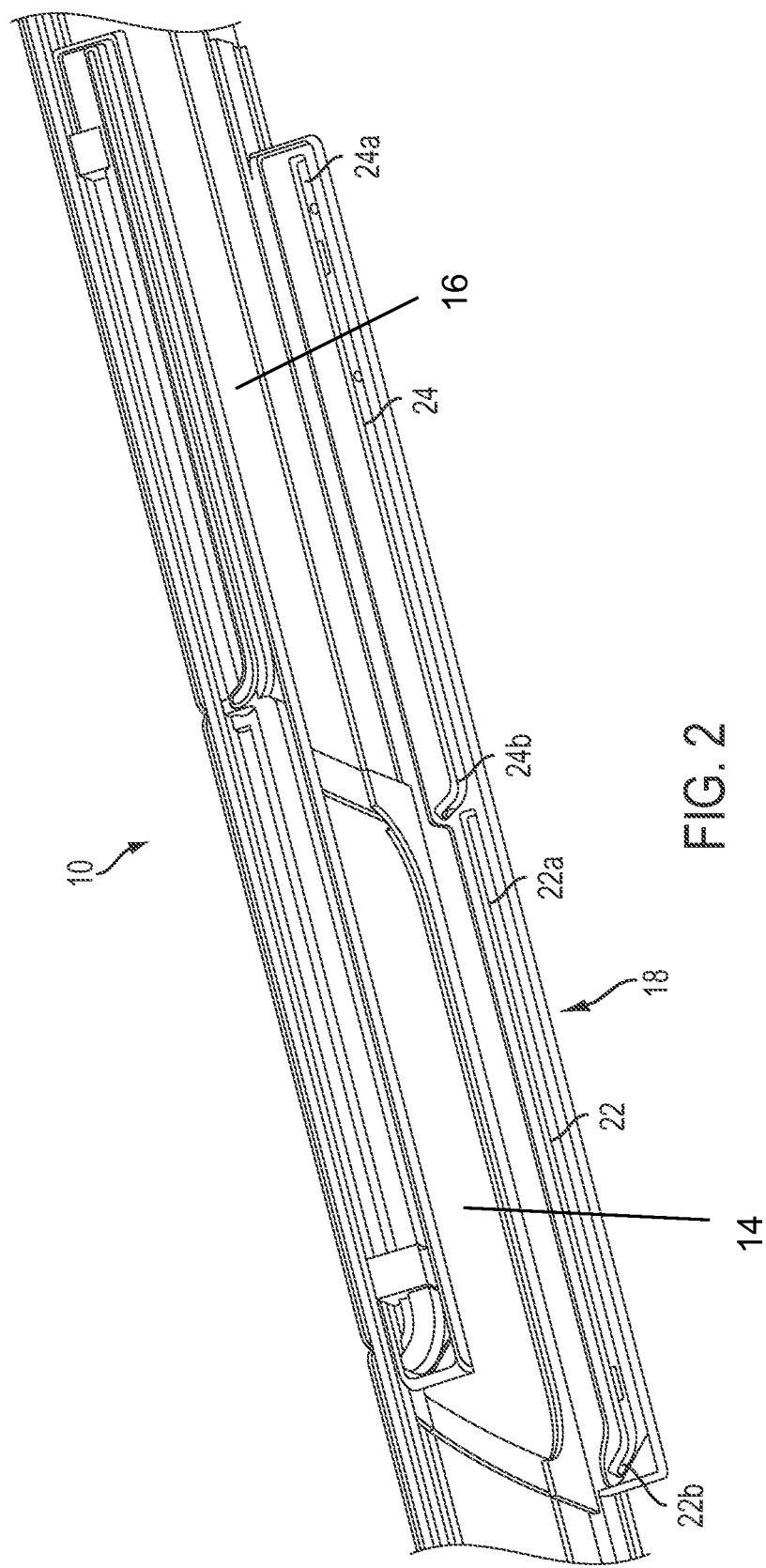
FIG. 2 is a partial perspective view of a sunroof assembly of the present invention, as viewed from below the roof and looking upwards at the underside of the vehicle roof and sunroof assembly.
Figure 3:
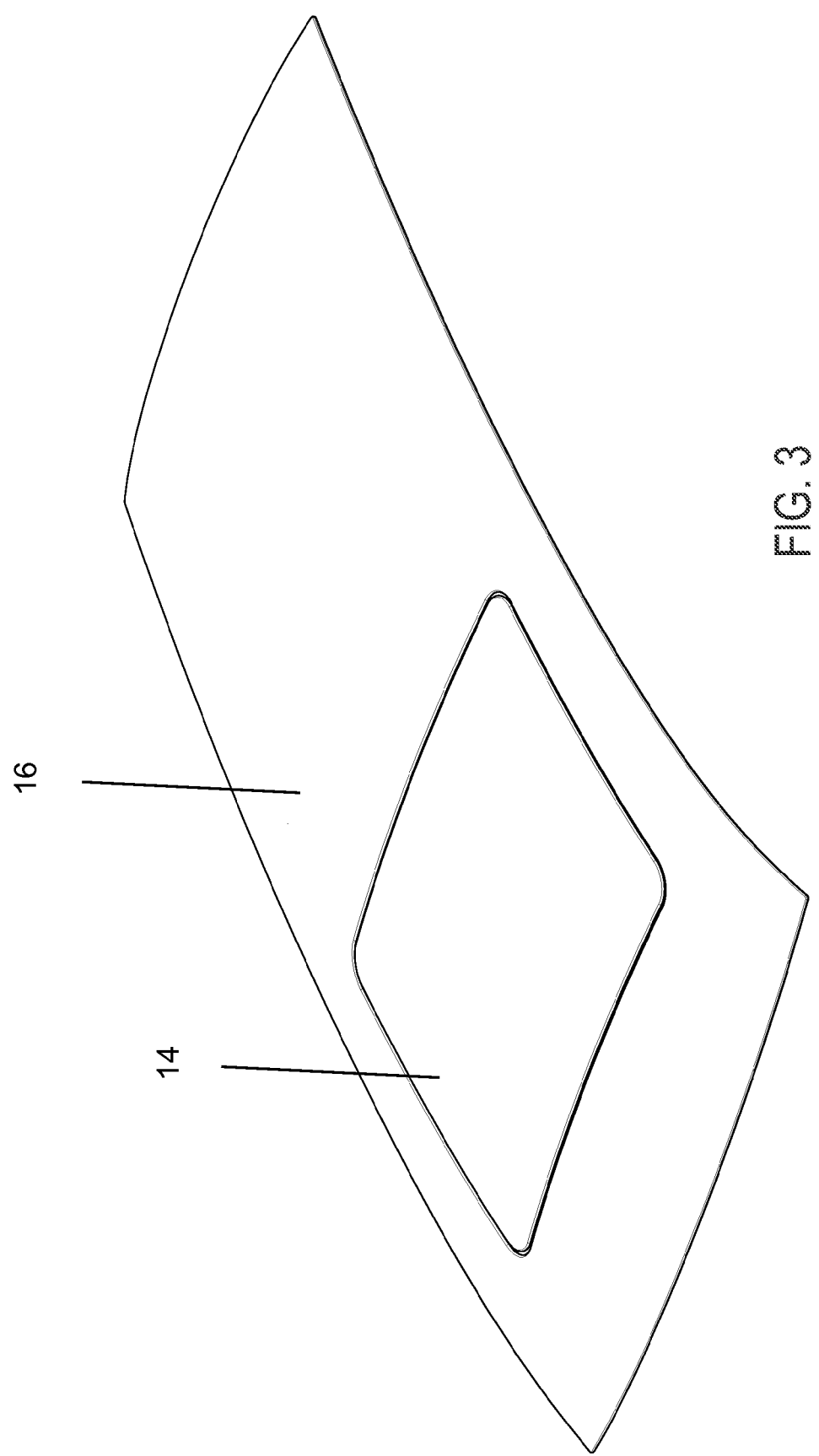
FIG. 3 is a perspective view of the sunroof window assembly of the present invention.

For example, and with reference to FIG. 2, the flush sunroof window assembly 10 of a vehicle includes a frame portion having side rails 18 disposed at the roof (such as via adhesive attachment of the rails at the in-cabin surface of a glass roof) and at opposite sides of the aperture formed through the roof, whereby the movable panel 14 is movable relative to the frame and fixed roof panel between an opened position (where the movable window panel assembly is disposed behind and generally along a portion of the roof panel) and a closed position (where an outer surface of the glass window panel is generally flush with or coplanar with the outer surface of the fixed roof). The movable window panel assembly comprises a glass window panel that is supported by or bonded to a carrier or frame 28 (such as bonded to the frame via a one component urethane adhesive or other suitable adhesive or the like) that includes pins 26 and bearings or rollers or channel followers 30 that are at least partially received in channels 22, 24 formed or established along the rails of the window assembly to guide the movable panel along the rails between its opened and closed positions, as discussed below.

Figure 11:
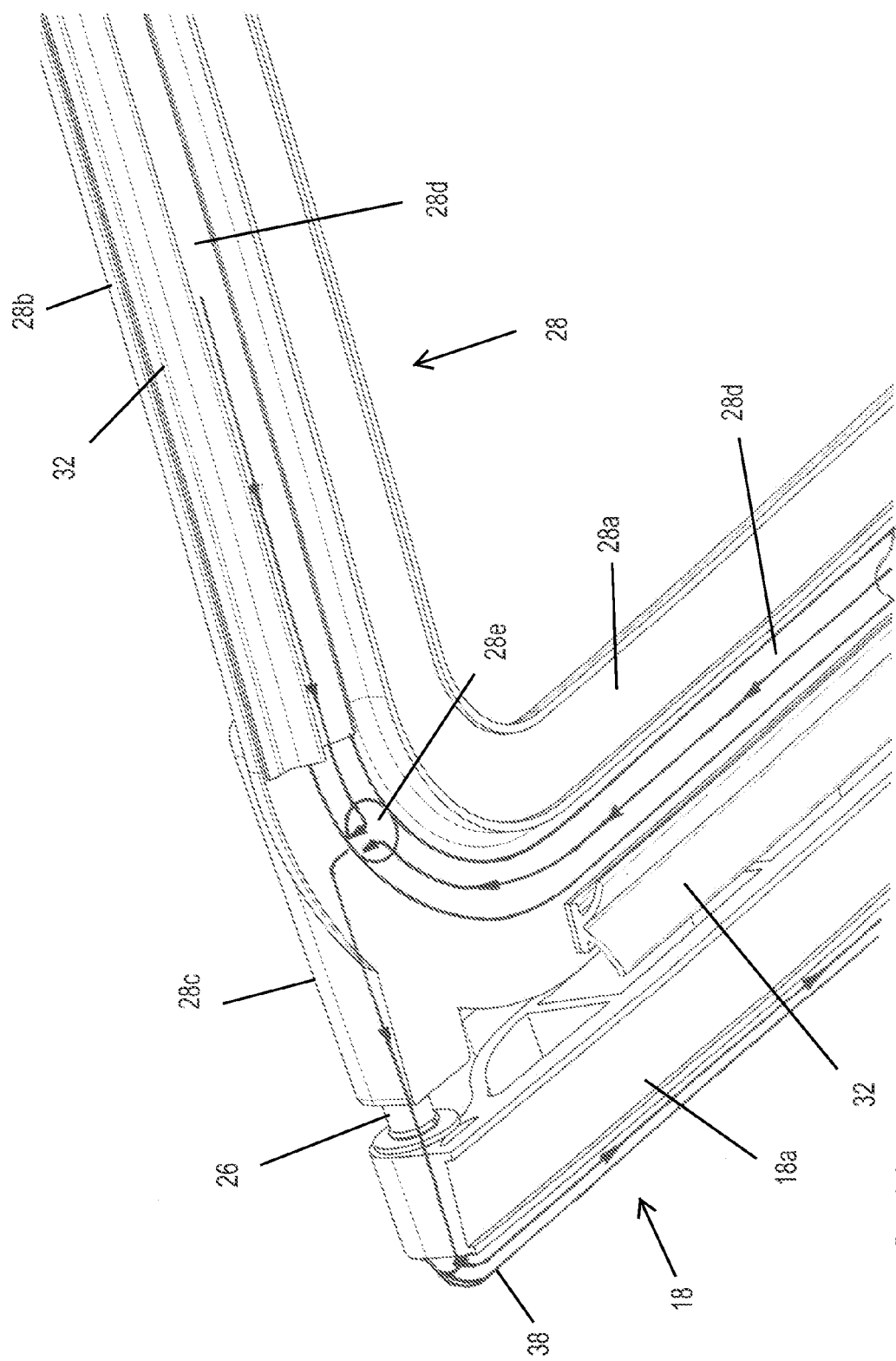
FIG. 11 is a perspective view of the movable frame and fixed track of the sunroof window assembly of the present invention, shown without the glass panels removed.

For example, and such as can be understood with reference to FIG. 11 (shown without the glass sunroof panel), the frame 28 comprises a generally rectangular frame (such as a molded polymeric frame) with an adhesive channel 28a for receiving an adhesive bead or the like for adhesively bonding the frame 28 to a perimeter region of the sunroof panel 14 (not shown in FIG. 11). The frame 28 includes an outer portion 28b outboard of the adhesive channel 28a that extends beyond the opening or hole in the fixed glass roof 16 (also not shown in FIG. 11), whereby a perimeter sealing element or seal 32 is disposed about a periphery region of the frame so as to engage the inner or lower surface of the fixed glass roof 16 when the sunroof panel is closed, as discussed below. The pins 26 are disposed at and extend from a molded boss or element 28c at each corner of the frame 28 to support the movable sunroof panel at its corners relative to the channels 22, 24 of the fixed glass roof 16.

Figure 5B:
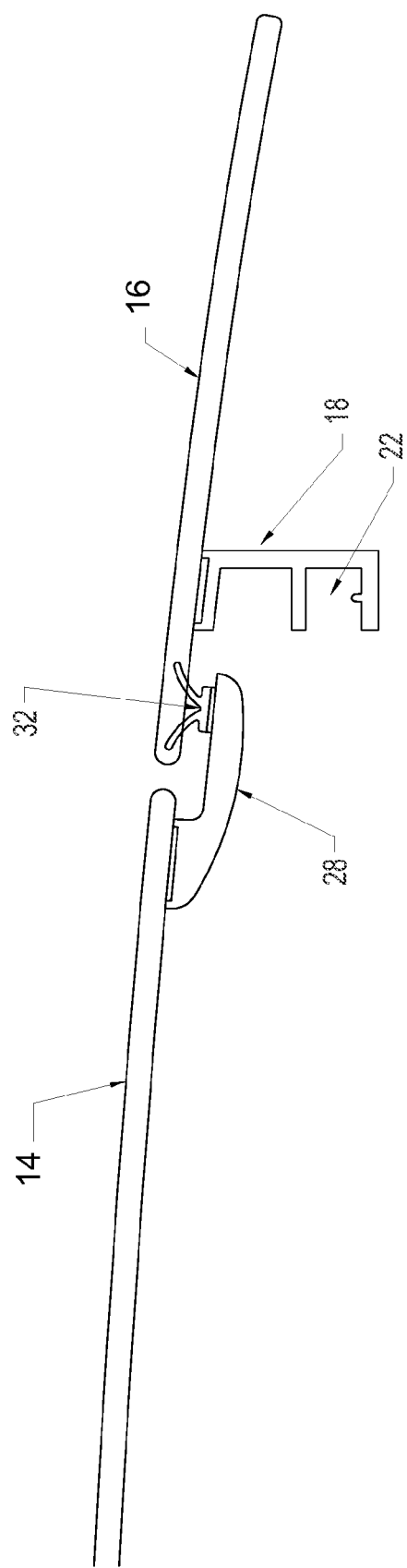
FIG. 5B is a sectional view of the sunroof window assembly taken along the line B-B in FIG. 5.
Figure 7:
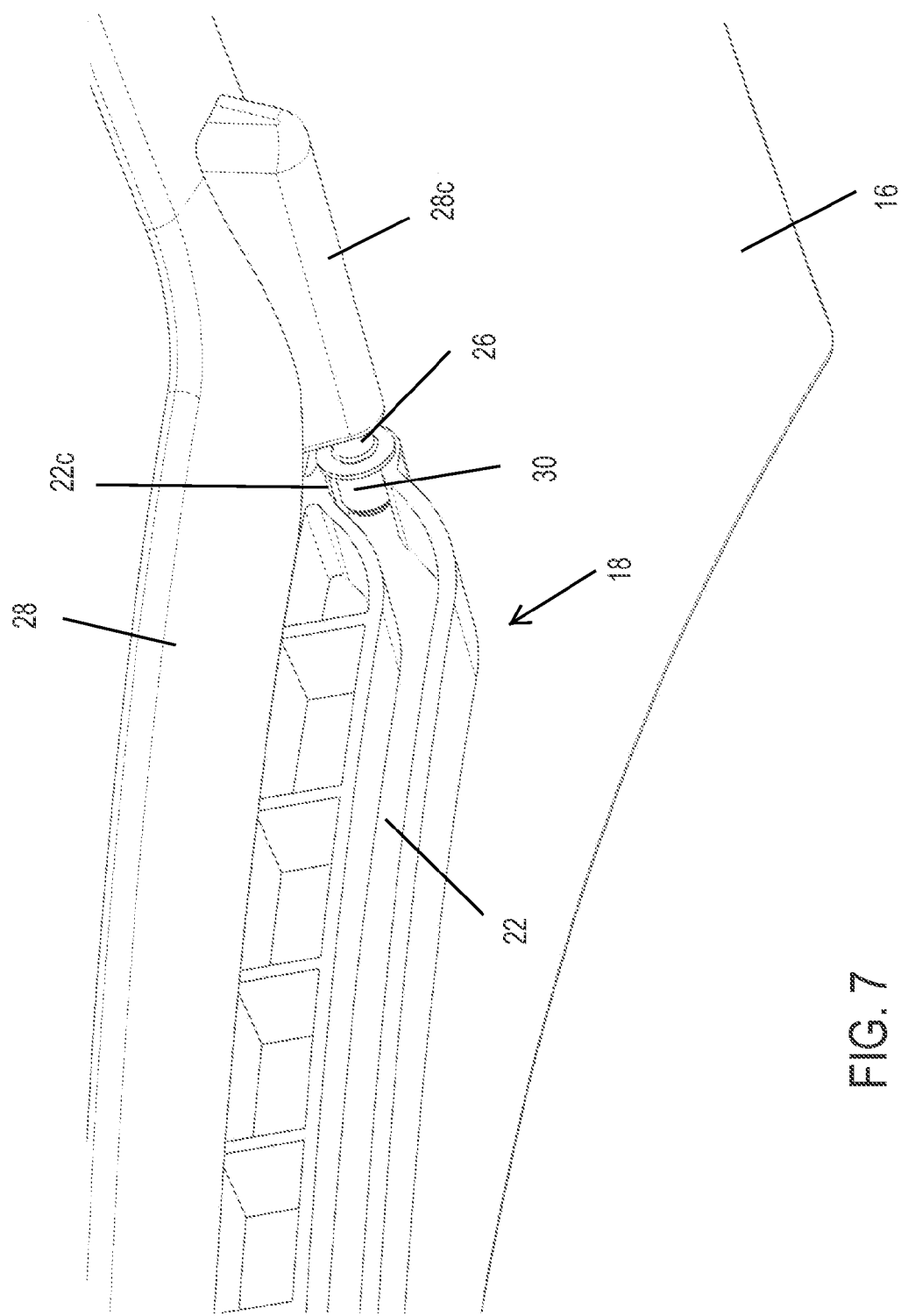
FIG. 7 is a perspective view of a front roller of the movable sunroof panel of the sunroof window assembly of the present invention, shown in its track when the sunroof panel is closed.
Figure 8:
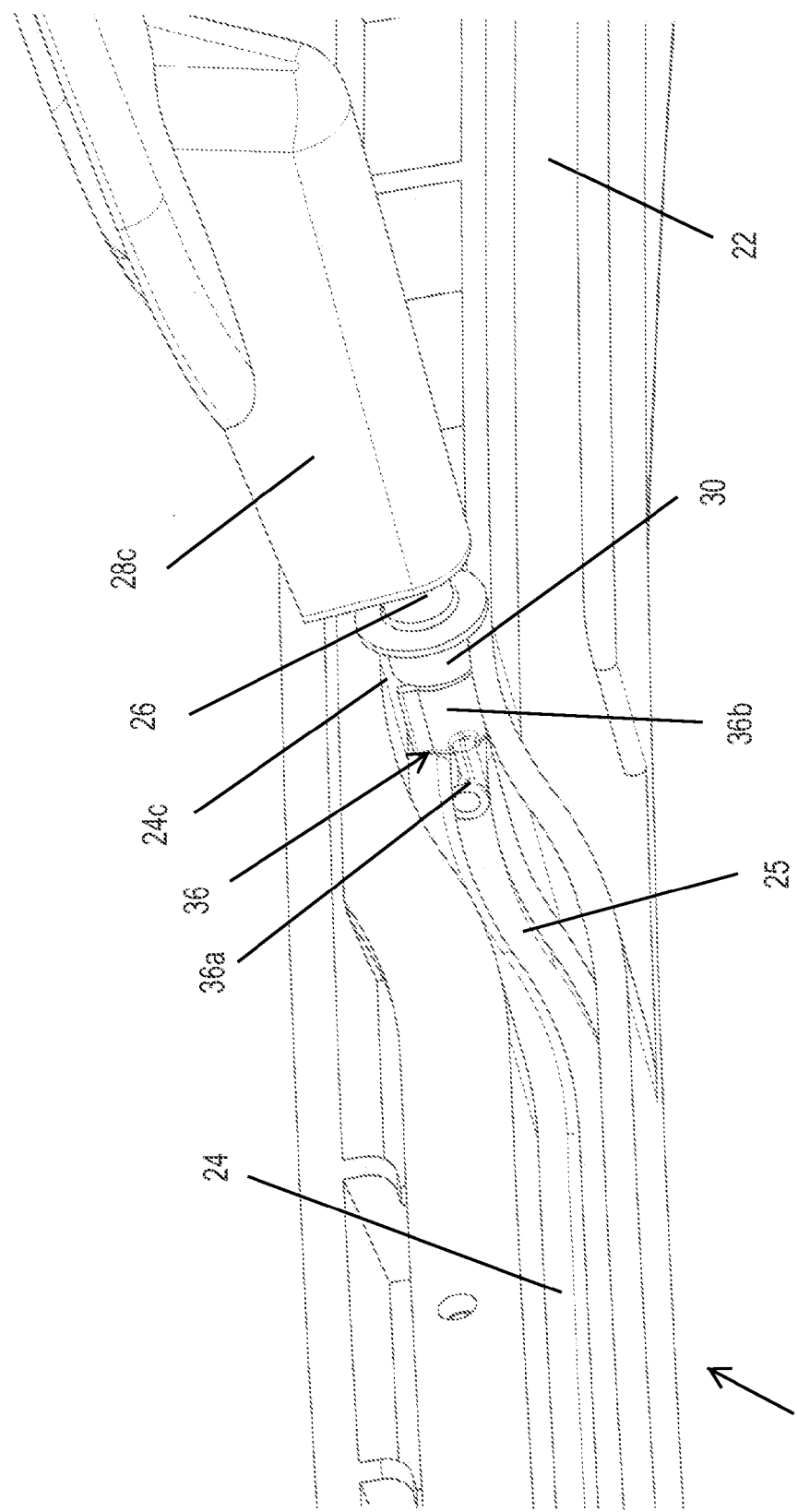
FIG. 8 is a perspective view of a rear roller of the movable sunroof panel of the sunroof window assembly of the present invention, shown in its track when the sunroof panel is closed.

As shown in FIGS. 2 and 4, each channel 22, 24 is bonded to the fixed window panel or glass roof along and outboard of the opening or aperture formed through the glass roof (see FIGS. 5B and 12). As shown in FIG. 11, each rail 18 includes an adhesive channel 18a for receiving an adhesive bead or the like for adhesively bonding the rail to the inner or lower surface of the fixed glass roof 16 (not shown in FIG. 11). As shown in FIGS. 2, 4, 7 and 8, each of the channels 22, 24 of rails 18 comprises a generally straight elongated portion 22a, 24a and a curved end portion 22b, 24b at its leading end (the end of the channel closest to the front end of the channel at the window opening). Thus, the movable window is moved along the elongated straight portions 22a, 24a of the channels towards the window opening (via the pin bearings 30 rolling along and within the channels), and moved upward along the curved end portions 22b, 24b to move the glass panel into the opening so that the window is closed and the outer surface of the movable glass panel is generally flush with or coplanar with the outer surface of the fixed window panel. Optionally, and such as shown in FIGS. 7 and 8, the channels 22, 24 may include an end receiving portion 22c, 24c. Thus, when the movable sunroof panel is fully closed, the pins 26 and bearings 30 are received in and supported by a generally horizontal channel portion.

Figure 9:
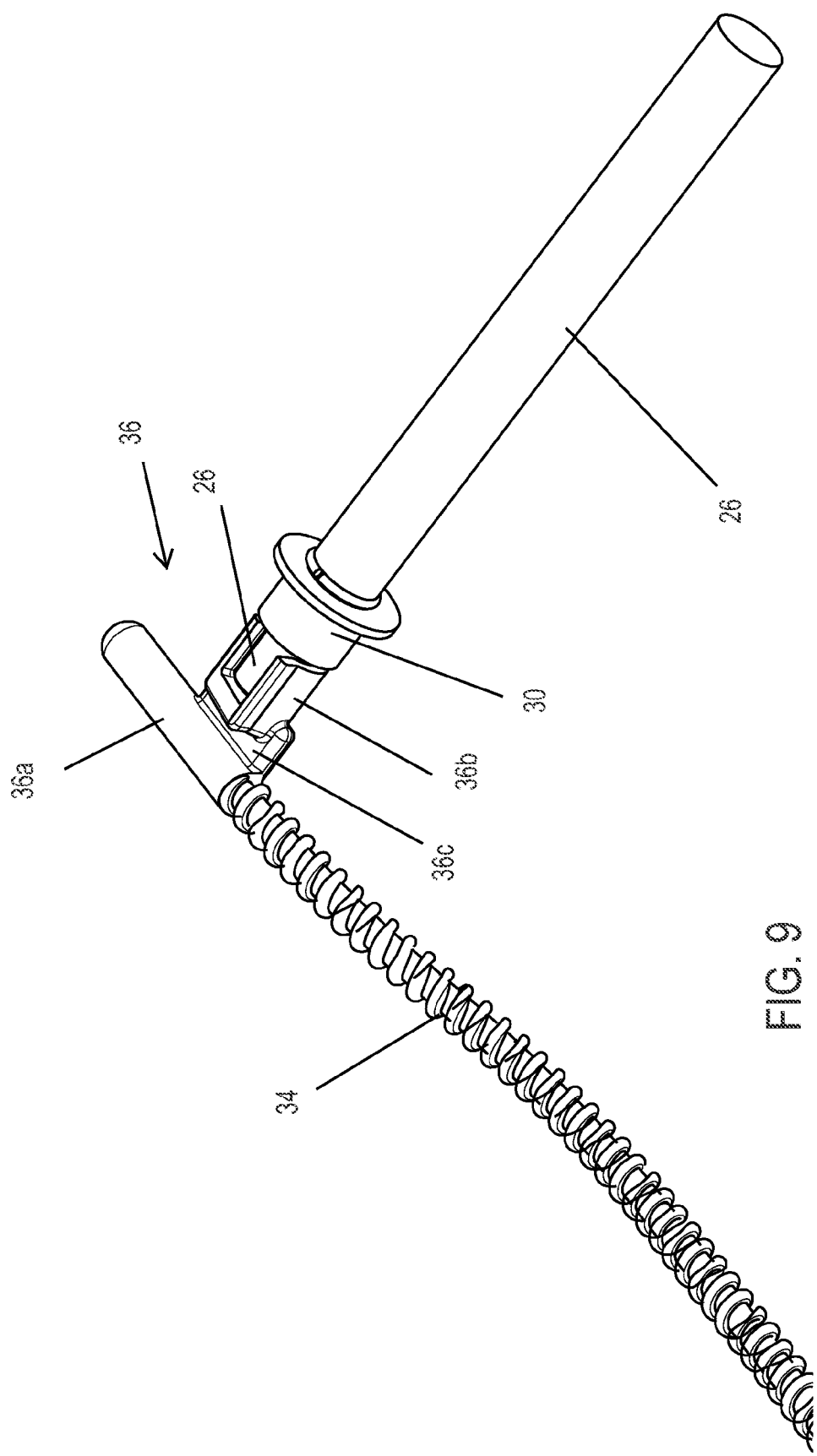
FIG. 9 is a perspective view of a helical drive element for moving the movable sunroof panel along the tracks between its opened and closed positions.
Figure 10:
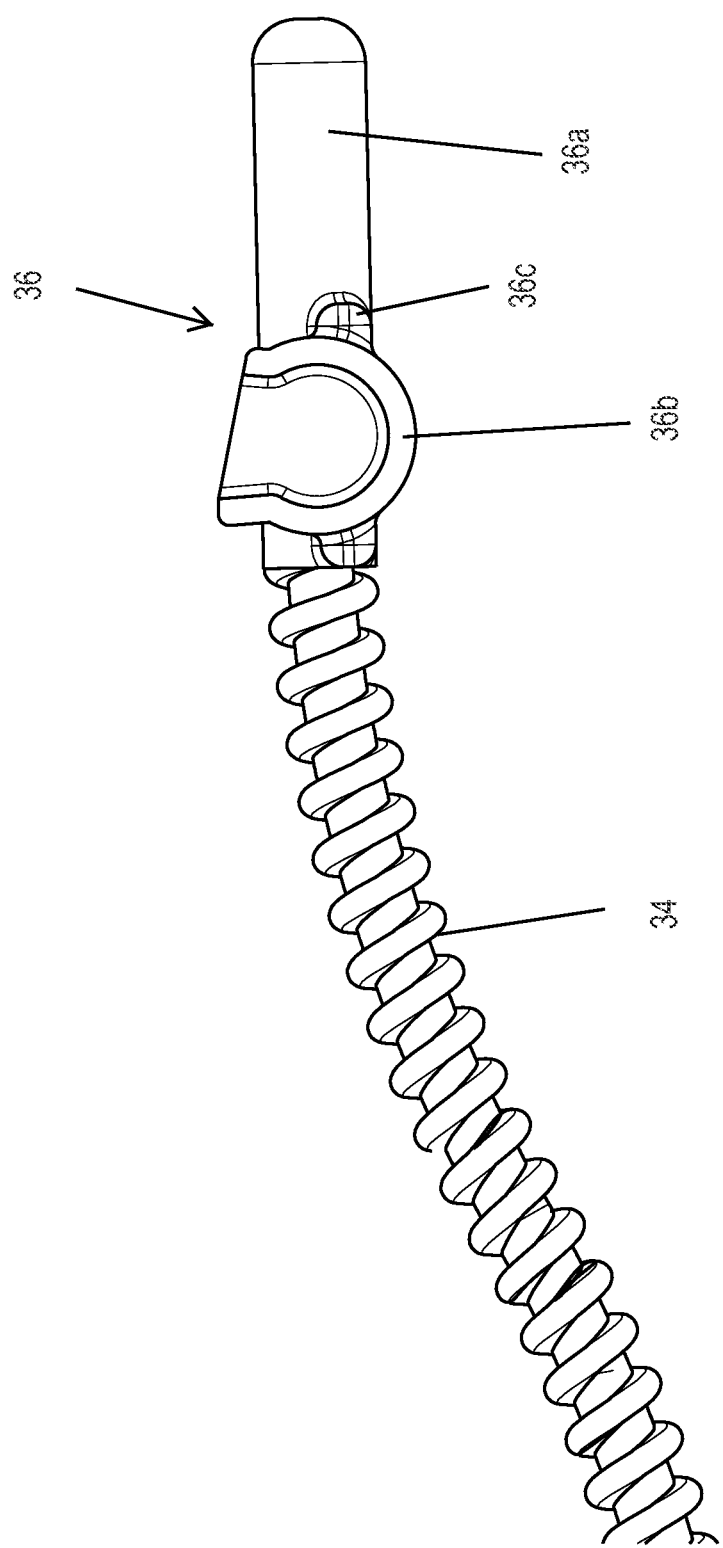
FIG. 10 is a side view of the helical drive element of FIG. 9.

The sunroof panel 14 may be moved relative to and along the channels via any suitable drive means. For example, and such as can be seen with reference to FIGS. 8-10, the sunroof panel 14 may be movable via a helical drive system, where an elongated helical cable or element 34 is disposed along each of the rear channels 24 (and is curved to follow the path of the respective channel) and a movable element or connector 36 is disposed at the helical element 34 and moves along the helical element when the helical element is rotatably driven by a drive motor or system. In the illustrated embodiment, the movable element or connector 36 comprises a molded plastic element having a receiving portion 36a and a pin connecting portion 36b. The receiving portion 36a receives the helical element therethrough (and is threaded or formed so as to engage the helical threads and move along the helical element responsive to rotation of the helical element). The pin connecting portion 36b receives or snaps onto the pin 26 (or extension of the pin) that extends from the rear boss 28c of the movable sunroof panel frame and that extends through and from the bearing of bushing 30.

The connector 36 is received through an inner channel or passageway 25 established through the rail 18 and outboard of the channel 24, such that the receiving portion 36a of connector 36 (and the helical element) is outboard of the rail 18, while the pin connecting portion 36b is within and moves along the channel 24 (with a guide portion 36c of connector 36 disposed between the receiving portion and connecting portion and guided along the slot or passageway 25 during operation of the drive system). Thus, when the helical element is rotatably driven or rotated (such as responsive to a user input or switch or button in the cabin of the vehicle), the connector moves along the helical element and moves the rear pins 26 and thus moves the frame 28 and movable sunroof panel 16 along the channels 22, 24 and rails 18.

Figure 6:
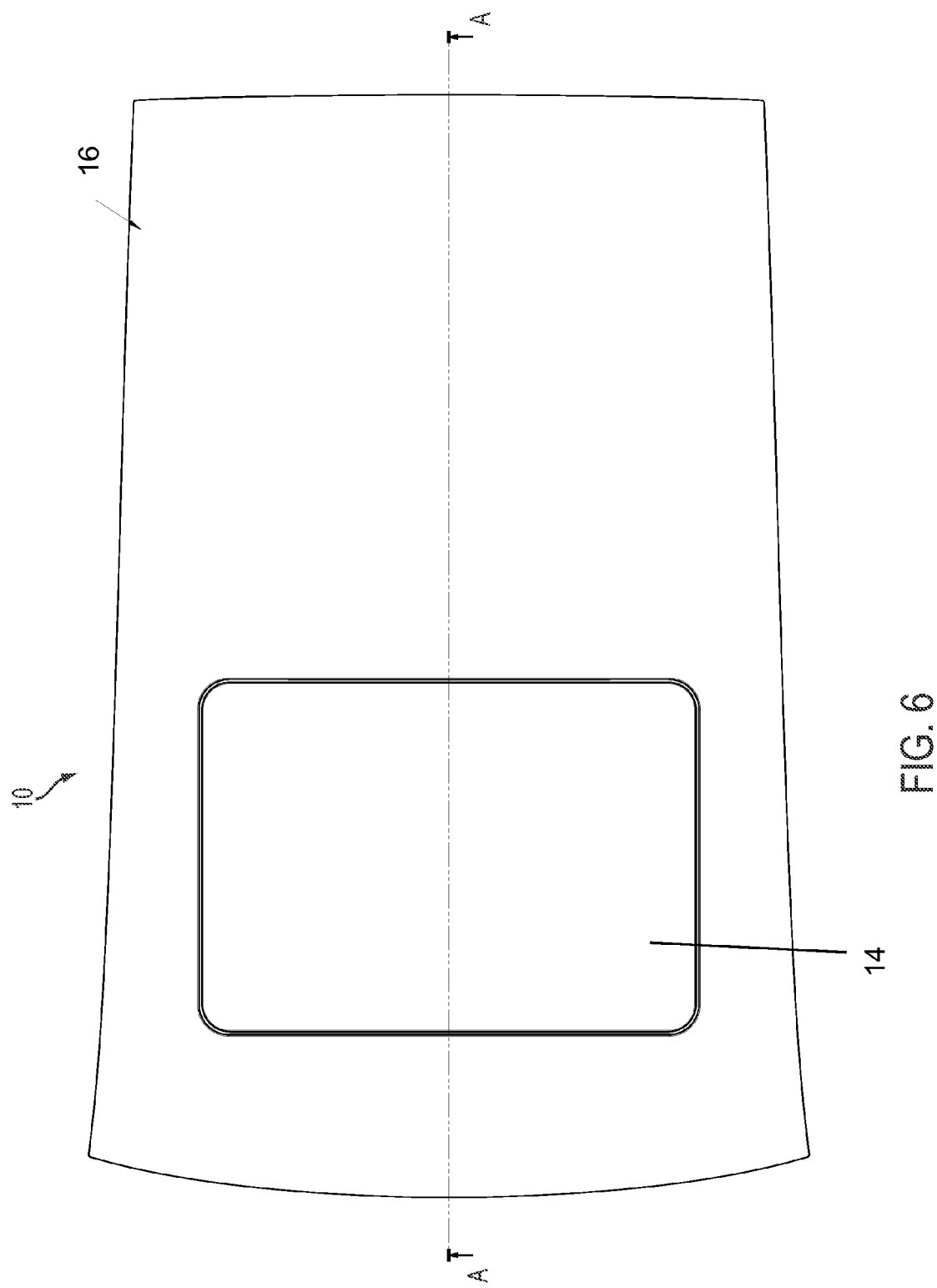
FIG. 6 is a plan view of the sunroof window assembly of FIG. 3.
Figure 6A:
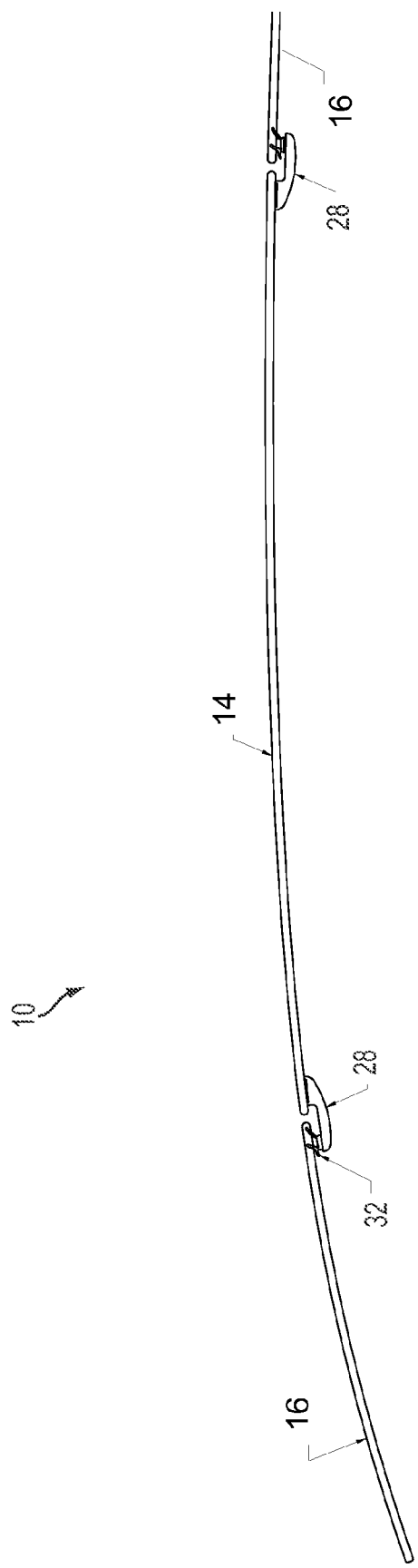
FIG. 6A is a sectional view of the sunroof window assembly taken along the line A-A in FIG. 6.

As shown in FIGS. 5B, 6A and 11, the frame 28 of the movable panel 14 includes the seal 32 disposed about the periphery of the frame 28. The seal engages the inner surface of the fixed window panel 16 when the movable panel 14 is moved to its closed position to seal the frame 28 relative to the fixed window panel 16 when the movable window panel 14 is closed. In the illustrated embodiment, the seal 32 comprises a Y-shaped seal the flexes to seal against the inner surface of the fixed window panel as the movable panel is moved upwards towards and into the aperture 15 and the seal is moved upward to engage the inner surface of the fixed window panel. Clearly, other shaped seals or sealing elements may be provided to substantially seal the movable panel and frame relative to the fixed panel when the sunroof is closed.

Optionally, the sunroof assembly 10 may include one or more drain channels to drain water that may flow onto the frame portion 28 through a gap between the sunroof panel 14 and fixed glass roof 16 when the sunroof is closed. For example, and with reference to FIGS. 11 and 12, the frame 28 may have a channel or groove 28d formed at the upper surface of the outboard portion 28b and outboard of the adhesive channel 28a and inboard of the seals 32 (although FIG. 11 shows that the corner region does not have a seal thereat, this is for clarity and the seals 32 preferably are disposed along the curved corner region to circumscribe the frame 28). The channels or grooves 28d are configured so that, when the sunroof is closed (and the seals 32 are sealed against the fixed glass roof 16) water that may flow between the generally flush sunroof panel and fixed glass roof will accumulate at and flow along the channels or grooves 28d.

The channels or grooves 28d are configured (such as by having higher regions at the center portions of the frames between the corners, with the higher regions being established via the curvature of the glass roof and glass sunroof panel and/or via varying thickness of the carrier or frame) to direct the flow of such water towards the corners of the frame 28, where the water may flow into a passageway or hole 28e of the frame 28 and through the bosses 28c and through the pins 26 (which may be hollow pins having passageways therethrough) and into the rails 18 (such as can be seen with reference to FIG. 12). The rails 18 may include or attach to passageways and/or tubes or conduits (such as tube or conduit 38 in FIG. 11) to guide the water along the rails and out to a drain at the periphery of the glass roof, such as where the roof is attached at the vehicle structure. The drain or tube or conduit at the rails may be routed along the rails and/or along a trim element or cover disposed at the in-cabin surface of the glass roof and to a perimeter region of the glass roof, so that the water may drain towards and to the outside of the vehicle (such as by utilizing aspects of any suitable drainage channels and/or tubes or the like for sunroof assemblies).

Optionally, the channels or rails and the guide elements and/or perimeter carrier may be adhesively attached to the roof surface and the movable panel, respectively, such as by utilizing aspects of the window assemblies described in U.S. Pat. Nos. 5,551,197 and 5,853,895, which are hereby incorporated herein by reference in their entireties. For example, the rails may be bonded to the fixed glass roof panel using any suitable adhesive, such as a one component urethane adhesive, such as a moisture cured adhesive, such as BETASEAL™ or the like, while the frame portion may be bonded to the movable panel, such as a glass window panel or polycarbonate window panel or the like, via any suitable adhesive, such as a moisture cured adhesive, such as BETASEAL™ or the like.

Optionally, and desirably, the movable panel is movable in response to actuation of a drive motor of a drive motor assembly or system, which may move cables or the like to impart horizontal movement of the movable panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. 2004-0020131 and/or 2008-0127563, which are all hereby incorporated herein by reference in their entireties.

Optionally, the sunroof may include a shade device or element. For example, the sunroof or movable panel may incorporate a shade element utilizing aspects of the window assemblies described in PCT Application No. PCT/US2014/027478, filed Mar. 14, 2014, and/or International Publication Nos. WO 2014/011395, WO 2012/177995, and/or WO 2011/133830, and/or U.S. Publication Nos. 2008-0106124 and/or 2006-0082192, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A sunroof assembly for a vehicle, said sunroof assembly comprising:

a frame portion having a first side rail and a second side rail;

wherein said frame portion is disposed at a vehicle roof, wherein the vehicle roof comprises a glass roof;

wherein the glass roof has an aperture formed therethrough;

wherein said first and second side rails are adhesively attached at an in-cabin surface of the glass roof;

a movable window panel that is movable along said first and second side rails via a plurality of support elements that engage and move along said first and second side rails, wherein said movable panel comprises a glass movable panel, and wherein said movable window panel is movable between a closed position and an opened position;

wherein, with said movable panel in its closed position, said movable panel is disposed at the aperture and has its upper surface generally co-planar with the upper surface of the glass roof;

wherein, when said movable panel is moved from its closed position towards its opened position, said movable panel moves downward along said first and second side rails and along and below a portion of the glass roof;

wherein said movable window panel is moved along said first and second side rails via a helical drive system comprising a helical element disposed along said first side rail, and wherein rotation of said helical element imparts movement of a connecting element that connects to a respective portion of said movable window panel; and wherein said connecting element has a receiving portion that receives said helical element at one side of said first side rail and a connecting portion that connects at one of said support elements at another side of said first side rail, and wherein a portion of said connecting element between said receiving portion and said connecting portion is guided along a slot formed through an outer wall of said first side rail.

2. The sunroof assembly of claim 1, wherein said first and second side rails comprise channels along which guide elements of said movable panel travel as said movable panel is moved between its opened and closed positions.

3. The sunroof assembly of claim 2, wherein said channels each comprise a generally straight portion and a curved portion, and wherein said guide elements move downward along said curved portions when said movable panel is moved from its closed position towards its opened position, and wherein said guide elements move along said generally straight portion as said movable panel moves further towards its opened position.

4. The sunroof assembly of claim 1, wherein said movable window panel is supported by a frame that includes said support elements that movably engage said first and second side rails to move said movable window panel between said opened and closed positions.

5. The sunroof assembly of claim 4, wherein said support elements of said frame comprise pins and rollers and wherein said pins extend from respective corner regions of said frame for engaging and moving along channels of said first and second side rails.

6. The sunroof assembly of claim 5, wherein said rollers are disposed at ends of said pins for rollingly engaging said channels of said first and second side rails.

7. The sunroof assembly of claim 4, wherein said frame includes a perimeter sealing element that circumscribes said frame and said movable window panel, said sealing element engaging the in-cabin surface of the glass roof when said movable window panel is moved towards and into said closed position.

8. The sunroof assembly of claim 7, wherein said frame is adhesively bonded at the in-cabin surface of said movable window panel and about a perimeter region of the in-cabin surface of said movable window panel, and wherein said frame protrudes radially outwardly from the perimeter region of said movable window panel such that said perimeter sealing element is disposed radially outboard of said movable window panel to engage the in-cabin surface of the glass roof when said movable window panel is moved towards and into said closed position.

9. A sunroof assembly for a vehicle, said sunroof assembly comprising:

a frame portion having a opposite side rails;

wherein said side rails are adhesively attached at an in-cabin surface of a vehicle glass roof;

wherein the glass roof has an aperture formed therethrough and between said side rails;

wherein each side rail comprises a front channel and a rear channel;

a carrier adhesively attached at an in-cabin surface of a movable glass sunroof panel;

wherein said carrier includes front rollers protruding from opposite sides of a front region of said carrier and rear rollers protruding from opposite sides of a rear region of said carrier;

wherein said front rollers movably engage the respective front channels of said side rails and said rear rollers movably engage the respective rear channels of said side rails to move said carrier and said movable glass sunroof panel along said side rails between a closed position and an opened position;

wherein, with said movable glass sunroof panel in its closed position, said movable glass sunroof panel is disposed at the aperture and has its upper surface generally co-planar with the upper surface of the vehicle glass roof;

wherein, when said movable panel is moved from its closed position towards its opened position, said front rollers move downward and rearward along said front channels and said rear rollers move downward and rearward along said rear channels and along and below a portion of the vehicle glass roof;

wherein said movable glass sunroof panel is moved along said side rails via a helical drive system comprising a rotatable helical element disposed along a respective one of said rear channels of said side rails, and wherein rotation of said helical element imparts movement of a connecting element that connects at a respective rear roller of said carrier of said movable glass sunroof panel; and wherein said connecting element has a receiving portion that receives said helical element at one side of the respective side rail and a connecting portion that connects at the respective rear roller at said rear channel, and wherein a portion of said connecting element between said receiving portion and said connecting portion is guided along a slot formed through an outer wall of the respective side rail and along said rear channel.

10. The sunroof assembly of claim 9, wherein said front and rear channels each comprise a generally straight portion and a curved portion, and wherein said front and rear rollers move downward along said curved portions of said front and rear channels, respectively, when said movable panel is moved from its closed position towards its opened position, and wherein said front and rear rollers move along said generally straight portions of said front and rear channels, respectively, as said movable panel moves further towards its opened position.

11. The sunroof assembly of claim 9, wherein said rollers are rotatably mounted on respective pins that extend from respective corner regions of said carrier.

12. The sunroof assembly of claim 9, wherein said carrier includes a perimeter sealing element that circumscribes said movable glass sunroof panel, said sealing element engaging the in-cabin surface of the vehicle glass roof when said movable glass sunroof panel is moved towards and into said closed position.

13. The sunroof assembly of claim 12, wherein said carrier protrudes radially outwardly from the perimeter region of said movable glass sunroof panel such that said perimeter sealing element is disposed radially outboard of said movable glass sunroof panel to engage the in-cabin surface of the vehicle glass roof when said movable glass sunroof panel is moved towards and into said closed position.

* * * * *